INVENTORS
PHILIP D. COREY AND
ARMISTEAD L. WELLFORD
BY Isidore Match
ATTORNEY

INVENTORS
PHILIP D. COREY AND
ARMISTEAD L. WELLFORD
BY Isidore Match
ATTORNEY

# United States Patent Office 3,373,338
Patented Mar. 12, 1968

3,373,338
POWER CONVERSION SYSTEM WITH MAGNETICALLY FORCED VOLTAGE SHARING FOR THE SWITCHING DEVICES
Philip D. Corey and Armistead L. Wellford, Waynesboro, Va., assignors to General Electric Company, a corporation of New York
Continuation of application Ser. No. 260,257, Feb. 21, 1963. This application Feb. 2, 1967, Ser. No. 613,684
7 Claims. (Cl. 321—27)

ABSTRACT OF THE DISCLOSURE

A transistorized inverter employing a single multiple-winding transformer to achieve lossless forced collector voltage sharing, permitting improved operation of the oscillator from very high voltage DC power sources with high efficiency.

Figure 1:
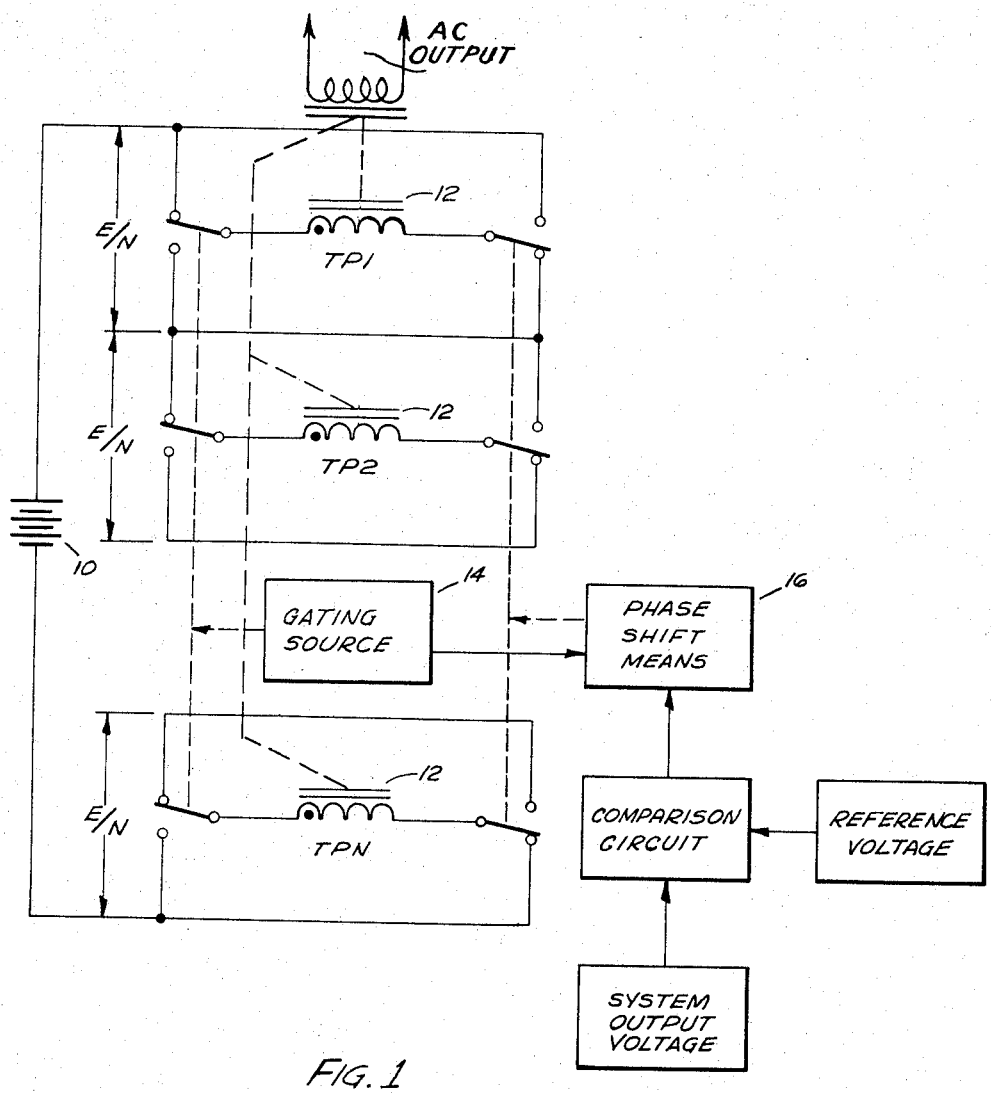

This invention relates to power handling arrangements. More particularly, it relates to an arrangement for enabling the handling of voltages which are substantially in excess of the voltage capabilities of the individual active components comprising the arrangement. This application constitutes a continuation of application Ser. No. 260,257, filed Feb. 21, 1963, which has become abandoned.

In circuits which include as a function thereof the conversion of a unidirectional potential to an alternating current potential, a limiting factor heretofore on the value of the unidirectional potential to be so converted has been the maximum voltage which the switching devices in the circuit are capable of handling. For example, in a transistor converter, the limiting factor has been the maximum voltage which may be applied between the emitters and the collectors of the respective switching transistors. The same limiting factor has also been present wherein gate controlled rectifiers have been used as the switching devices in the converter although, generally, gate controlled rectifiers can handle greater voltages than transistors. However, the voltage ratings of the gate controlled rectifiers whether "high" or "low" still determine the maximum unidirectional voltage which can be safely handled. Of course, converter circuits of bridge configuration can be utilized to handle proportionately greater voltages in any case but the voltage handling capacity of the individual switching devices in these bridge circuits presents the same limiting factor.

Accordingly, it is an important object of this invention to provide an arrangement in a conversion system comprising a plurality of converters wherein the unidirectional potential supplied to the system can greatly exceed the voltage handling capacity of the individual switching devices comprising the system.

It is another object to provide an arrangement in accordance with the preceding object wherein the voltage handling capacity of the individual switching devices need only be equal to the value of unidirectional potential being converted divided by the number of converters in the system.

Generally speaking and in accordance with the invention, there is provided a system for converting the output of a unidirectional potential source to an alternating current potential comprising a given plurality of converters, each of the converters having first and second legs. Each of the legs contains voltage switching means capable of being switched to a first or second direction. The first and second legs are in respective series arrangements, each of the series arrangements being adapted to be connected across the unidirectional potential source. There are further included in the system, means in circuit with the switching means for concurrently switching each of the switching means in one of the series arrangements to the same direction and a plurality of transformers respectively comprising the aforesaid given plurality of like primary windings. All of the primary windings are wound on a single core, each of the primary windings respectively coupling the switching means in the legs of a converter.

The novel features, which are believed to be characteristic of this invention, are set forth with particularity in the appended claims. The invention itself, however, both as to its organization and method of operation, together with further objects and advantages thereof, may best be understood by reference to the following description when taken in connection with the accompanying drawings.

Figure 2:
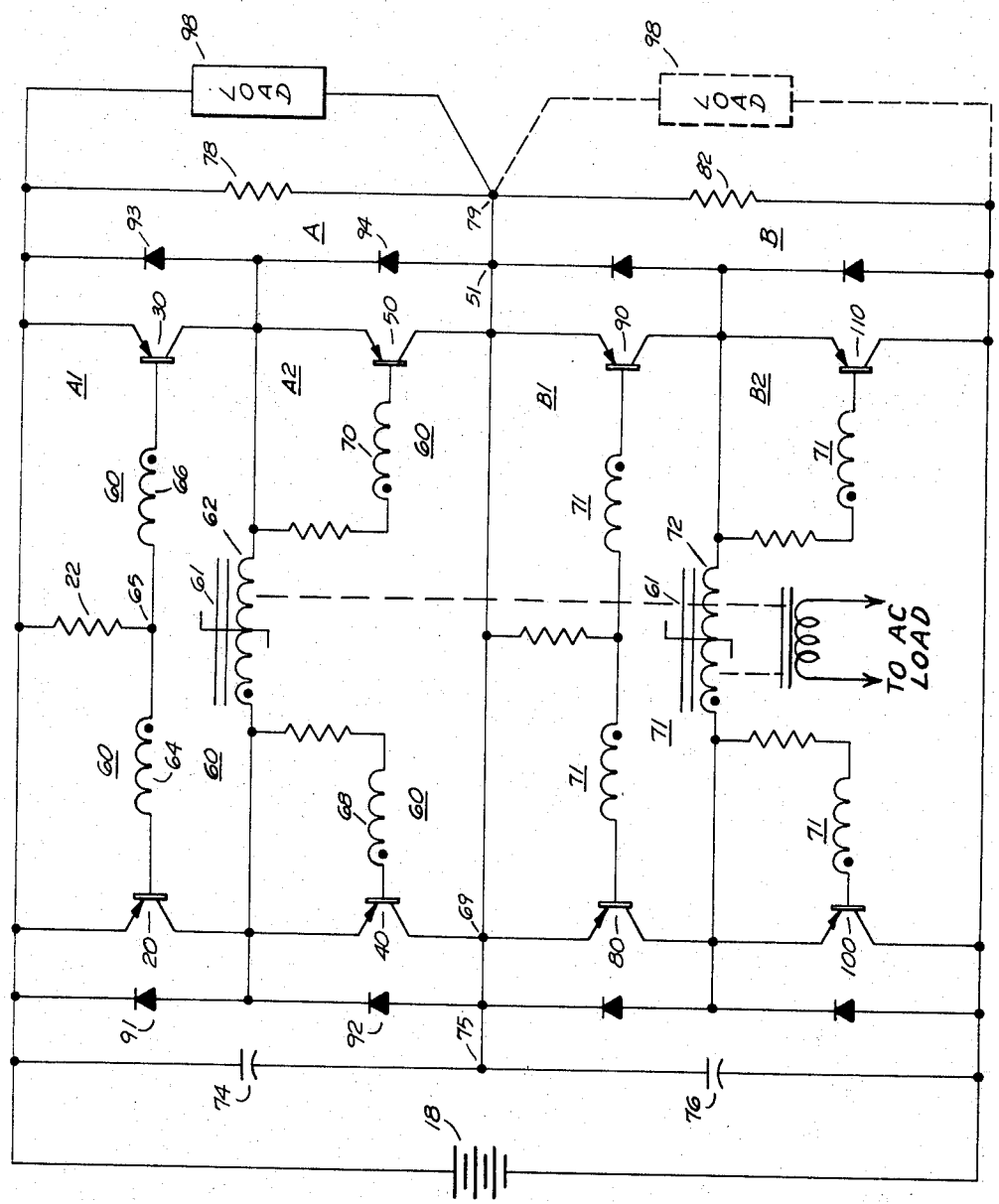

In the drawings, FIG. 1 is a diagram which conceptually illustrates a system constructed in accordance with the principles of the invention; and FIG. 2 is a schematic depiction of an illustrative embodiment of the system of FIG. 1 utilizing transistor bridge converters as the power converting components therein.

Referring now to FIG. 1, there is shown conceptually therein, a power conversion system constructed in accordance with the principles of the invention in which the unidirectional potential power converted to an alternating current potential by the system may greatly exceed the voltage handling capacity of the individual switching devices contained therein. The switching devices therein which may be active devices such as relays, thyratrons, transistors, silicon controlled rectifiers, etc., are depicted for convenience of explanation as single pole double throw electromechanical switches.

Thus, in FIG. 1, a power conversion system is shown which comprises N individual converters, each converter comprising a pair of switches contained in parallel arranged legs, each pair of switches being coupled by the primary winding of a transformer. The primary windings of this transformer, TP1, TP2 to TPN, etc. are suitably alike and all are wound on the same core 12. The unidirectional potential source 10 whose output is converted to an alternating current potential by the power conversion system is depicted as a battery. The primary windings are all poled in the same direction as shown by the respective polarity dots thereon. The gating source 14 which may be a pulse generator, a multivibrator, or like circuit may be external to the system or may be an inherent part thereof.

It is seen by the position of the switch poles in FIG. 1 that all of the switches in the "left" legs of the individual converters are concurrently operated by gating source 14 in the same direction and all of the switches in the "right" legs are also operated by gating source 14 in the same direction. However, the left switches and the right switches need not be operated in phase. Thus, with a given phase output from source 14 operating the left switches in the "upward" direction, its opposite phase output need not simultaneously operate the right switches in the downward direction, the time of operating the right switches being dependent upon the degree of phase shift imparted by phase shift means 16. Of course, if the left and right switches are simultaneously operated in opposite directions by opposite phase outputs of gating source 14, then the outputs on the respective primary windings will be rectangular waves. However, in the event that there is a phase shift imparted by the action of phase shifting means 16, then the ouputs appearing on the respective primary windings are quasi-rectangular waves, the value of the dwell angles therein being dependent upon the degree of phase shift imparted by phase shift means 16. The action of phase shift means 16 may be in response to the deviation of the output voltage of the system from a desired value and suitably may be a saturable reactor or like device.

It is readily appreciated in the system of FIG. 1 that each switching device therein need only be rated to handle a voltage equal to $E/N$ wherein E is the value of the voltage from source 10 and N is the number of the individual converters in the system. Accordingly, each primary winding carries only its fractional share of the voltage, i.e., $E/N$. The primary windings may be coupled to single secondary winding so that there appears in such single secondary winding, an alternating current potential whose value will depend on the ratio of the turns in the secondary winding to the turns in a primary winding multiplied by the voltage carried in each primary winding. It is to be realized that coupled windings (as those placed on the same leg of a transformer core) have equal induced volts per turn. Therefore, identical windings will have identical voltages at all times. The placing of all of the primary windings on the same core insures voltage sharing thereby.

In FIG. 2, wherein there is schematically depicted an illustrative embodiment of the system of FIG. 1 utilizing transistor bridge converters, a pair of magneic coupled multivibrators taken together and sharing the same primary winding forming a bridge. Thus, bridge A is formed by a multivibrator A1 and a multivibrator A2 which share the same primary winding 62 and bridge B is formed by a multivibrator B1 and a multivibrator B2 which share the same primary winding 72, all of the multivibrators suitably being alike in structure and operation.

Thus, for example, in bridge A, transistors 20 and 30 and transistors 40 and 50 together with their associated circuit components comprise respective magnetic coupled multivibrators A1 and A2 utilizing a square loop characteristic. Such type multivibrator has a constant volt-second characteristic such that when constant voltage is applied thereto, a constant frequency output is produced therefrom.

For example, in mulivibrator A1, transistors 20 and 30 alternately apply half the voltage from unidirectional potential source 18 to the primary winding 62 of a saturable transformer 60. Upon the application of this potential, both of transistors 20 and 30 tend to conduct. However, any small unbalance causes one transistor to become conductive before the other. If it is assumed that transistor 20 is rendered conductive first, the polarity of secondary winding 64 is such that when transistor 20 conducts, the positive voltage applied at the polarity dot terminal of winding 64 induces a negative voltage at the base of transistor 20 with respect to junction 65 thereby increasing the conductivity in transistor 20 and holding it conductive until transformer 60 saturates a constant number of volt-seconds later. While transistor 20 is biased in the conductive direction, the reverse polarity induced at the polarity dot terminal of secondary winding 66 biases transistor 30 further in the nonconductive direction. When transformer 60 saturates after transistor 20 has been conductive, the base drive on transistor 20 abruptly collapses and transistor 30 substantially immediately is rendered conductive. In this manner, transistor 30 supplies the other half cycle of output of multivibrator. Resistor 22, functions to limit the base current in the conducting transistor.

It is noted that secondary windings 64 and 70 are similarly poled relative to their respective transistors 20 and 50 and secondary windings 68 and 66 are similarly poled relative to their respective transistors 40 and 30. Thus, transistors 20 and 50 are concurrently conductive to produce a half cycle of output on primary winding 62 of one polarity and transistors 30 and 40 are similarly concurrently conductive to produce the half cycle of output on winding 62 of the opposite polarity. The frequency of the output is determined by the volt-second characteristic of the core 61 of transformer 60.

Bridge converter B is formed by like multivibrators B1 and B2 sharing the same primary winding 72 similar to bridge converter A formed by multivibrators A1, A2 sharing the same primary winding 62. In the operation of bridge converter B, the same events ensue as in the operation of bridge converter A. If the bridge converters A and B are alike, if primary winding 62 of the converter A output transformer 60 and primary winding 72 of the converter B output transformer 71 are also alike and wound on the same core 61, and if primary windings 62 and 72 are similarly poled, then like rectangular wave voltages which are in phase appear on windings 62 and 72 respectively. Each of these voltages is an alternating current output resulting from the conversion of half of the output of unidirectional potential source 18. Accordingly, it can be considered that bridges A and B are independent multivibrators and that the combination of these multivibrators on a single transformer core forces voltage sharing between the multivibrators.

It is appreciated that transistor switching in corresponding legs in the converters, for example, the switching of transistors 20 and 80, 40 and 100, 30 and 90, and 50 and 110 may not occur precisely simultaneously due to inherent differences existing even in presumably identical transistors. To insure that the voltage from source 18 is shared so that no transistor in the sysem at any time is subjected to more than half of the voltage therefrom, the series arrangements of capacitors 74 and 76 having a junction 75 therebetween and resistors 78 and 82 having a junction 79 therebetween are connected across source 18, resistors 78 and 82 and capacitors 74 and 76 respectively preferably being equal to each other. As shown, junction 75, the junction 69 of transistors 40 and 80, the junction 51 of transistors 50 and 90 and junction 79 are interconnected. Pumpback diodes such as diodes 91, 92, 93 and 94 in converter A are included, connected in their cathode to anode paths across the emitter collector of each transistor 20, 40, 30 and 50 respectively, to enable the return of power to source 18 where the load may be of the reactive type. The respective transistors of converter B have pumpback diodes similarly connected thereacross.

It has been found in practice that resistors 78 and 82 and capacitors 74 and 76 need only be small components. It has also been found that a comparatively large DC load such as load 98 may be connected from junction 79 to either end of source 18 without unbalancing the division of the voltage of source 18 across primary windings 62 and 72. Thus, with the arrangement of FIG. 2, utilizing only two converters as shown therein, each transistor need only be rated to handle half the voltage from source 18, and the input voltage is equally shared by primary windings 62 and 72 as explained in connection with FIGURE 1, a single secondary winding may be coupled to the primary windings TP1, TP2 . . . TPN so that the secondary winding produces an output alternating current. Similarly a second winding 73 may be coupled as shown in FIGURE 2 for example, to the common core 61 of the transformer 60, 71 for producing an alternating current output from the primary winding 62, 72. These windings are both coupled and can be coupled to a plurality of common secondary windings. Also, auxiliary loads requiring less than the total supply voltage may be inserted at any portion of the source voltage so divided. It is appreciated that any number N of converters, such as converters A and B, may be connected in series to enable the utilization of transistors having a voltage handling ability only equal to the value of the voltage from source 18 divided by N, provided, of course, that they share the same transformer.

It is, of course, to be realized that the same advantages that ensue from the arrangement of FIG. 2 will also obtain where other switching devices such as, silicon controlled rectifiers, for example, are utilized. Where such gate controlled rectifiers are used, they, of course, also may be of the type having lower voltage ratings than heretofore have been necessary. The arrangement of FIG. 2 consequently also substantially eliminates the need for additional protective circuitry which provides a precautionary function at higher voltages.

While there have been described what are considered to be the preferred embodiments of this invention, it will be obvious to those skilled in the art that various changes may be made therein without departing from the invention and it is, therefore, aimed in the appended claims to cover all such changes and modifications as fall within the true spirit and scope of the invention.

What we claim is new and desire to secure by Letters Patent of the United States is:

1. A system for converting the output of a unidirectional potential source to an alternating current potential comprising a given plurality of converters, each of said converters having first and second legs, each of said legs containing voltage switching means capable of being switched to a first or second direction, said respective first and second legs being in first and second series arrangements, said series arrangements being adapted to be connected across said unidirectional potential source, means in circuit with said voltage switching means for concurrently switching each of the voltage switching means in said first series arrangement to said one direction and the voltage switching means in said second series arrangement to said second direction, and transformer means comprising said given plurality of like primary windings, all of said primary windings being wound on a single core, each of said windings respectively coupling the switching means in the legs of one of said converters, and means for coupling the second direction side of the second leg of each converter to the first direction side of the first leg of the adjacent converter.

2. A system for converting the output of a unidirectional potential source to an alternating current potential comprising a given plurality of bridge converters, each of said converters having first and second legs, each of said legs containing series arranged first and second switching devices having respective switching device junctions therebetween and capable of being switched to a conductive and nonconductive state respectively, means for serially coupling said respective first and second legs in first and second series arrangements respectively, said serially coupled legs having respective leg junctions therebetween, said series arrangements being adapted to be connected across said unidirectional potential source, means in circuit with said devices for concurrently switching the first devices of one of said arrangements and the second devices of the other arrangement to one of said states while concurrently switching the second devices of said one arrangement and the first devices of said other arrangement to the other of said states, said last named means comprising a given plurality of transformer windings, each of said transformer windings coupling the switching device junctions at the first and second legs of a respective converter, all of said windings being wound on a same core, and means for coupling the leg junctions between adjacent serially connected legs of one series arrangement with the leg junctions between adjacent serially connected legs of the same converters in the second series arrangement.

3. A system as defined in claim 2 wherein each of said converters comprises a plurality of serially arranged magnetic coupled multivibrators, each of said multivibrators comprising parallel arrangements of said switching devices, respective secondary windings in circuit with each of said switching devices and associated with a respective first mentioned winding for providing drive to said switching devices.

4. A system as defined in claim 3 and further including a load adapted to be connected across a terminal and an intermediate point of said unidirectional potential source.

5. A system as defined in claim 3 and further including a pumpback diode respectively connected across each of said switching devices.

6. A system as defined in claim 3 and further including the parallel combination of a resistance and a capacitance connected across each of said converters for insuring voltage sharing in the absence of the concurrent same states of corresponding switching devices in said converters.

7. An inverter arrangement for converting, under the control of control signals available from a control signal source, direct current available from a source to alternating current for driving a load comprising a plurality of semiconductor switching devices, each device comprising a first and second main current carrying terminal and a third terminal for controlling switching of said device to a conductive or nonconductive state, means for coupling the main current carrying terminals of an even number of said devices greater than two in a first series path across said direct current source, means for coupling the main current carrying terminals of said even number of additional devices in a corresponding second series path across said direct current source, separate means conductively coupling the junction between each of the adjacent pairs of devices in said first series path with the corresponding junctions between each of the adjacent correspondingly positioned pairs of devices in said second series path, the odd numbered ones of said separate coupling means comprising separate primary winding means, means for coupling said switching signal source to each of said third terminals to simultaneously cause all of the odd numbered devices in one series path and the even numbered devices in the second series path to switch to one of said states while causing all of the even numbered devices in the second series path and the odd numbered devices in the second series path to switch to the other of said states and to alternate the switching of said states to produce said alternating current in said separate primary winding means, and a common secondary winding means magnetically coupled to each of said separate primary winding means for driving said load.

References Cited

UNITED STATES PATENTS

| | | | |
|---|---|---|---|
| 2,872,582 | 2/1959 | Norton | 331—114 |
| 2,953,754 | 9/1960 | Roesel | 331—113 |
| 3,259,831 | 7/1966 | Dortort | 321—27 X |

JOHN F. COUCH, *Primary Examiner.*

G. GOLDBERG, *Assistant Examiner.*